UNITED STATES PATENT OFFICE.

PAUL DEGENER, OF BRUNSWICK, ASSIGNOR TO CARL SPAETER, OF COBLENTZ, GERMANY.

PROCESS OF PURIFYING WATER.

SPECIFICATION forming part of Letters Patent No. 433,890, dated August 5, 1890.

Application filed March 10, 1890. Serial No. 343,375. (No specimens.) Patented in Austria-Hungary November 10, 1888, No. 21,862 and No. 40,263.

*To all whom it may concern:*

Be it known that I, PAUL DEGENER, doctor of philosophy and apothecary, a subject of the Duke of Brunswick, residing at Brunswick, in the Dukedom of Brunswick, German Empire, have invented certain new and useful Improvements in the Methods of Clarifying Liquids and Solutions Containing Organic Impurities; and I do hereby declare the following to be a full, clear, and exact description of the invention, such as will enable others skilled in the art to which it appertains to make and use the same.

A patent has been obtained for this invention in Austria-Hungary, No. 21,862 and No. 40,263, vols. 38 and 22, dated November 10, 1888.

The present invention relates to a process of clarifying liquids or solutions containing organic substances—such as albumen, arabino, &c.—which must be eliminated either on account of their putrescent influence or because their presence prevents the liberation of other substances contained in the solution. This process is conducted in the following manner: Magnesium carbonate is added to the liquid which is to be clarified, and after time enough has elapsed to allow of its action such a quantity of magnesia or magnesium hydrate is mixed with the solution that by the separation of the greater part of the organic substances, which then takes place, the liquid or solution thus treated is rendered capable of being filtered. It must now be filtered, and after the filtration sufficient lime must be added to decompose the magnesium carbonate, which has been dissolved, and to leave at the same time a slight surplus of lime in solution. The liquid is now filtered a second time, and, if necessary, the lime in the solution may then be precipitated by carbonic acid.

In carrying out the above process the temperature of the liquid is of no importance, the clarification being equally well effected in a cold or warm state. By varying the order mentioned above of adding the materials to clarify the liquid the same purifying effect will be observed, although the results are not quite so good.

The process may be modified by substituting sufficient lime for the magnesium hydrate, so that at this stage of the process magnesium hydrate will be formed, and at the same time the necessary surplus of magnesium carbonate remains. Lastly, the process may be performed by adding a sufficient quantity of lime at first, so that all the magnesium carbonate added before or after will be decomposed, a small surplus of lime, however, remaining in solution. The clarifying results, however, gained in this case are not so good. Baryta and strontium or the corresponding hydrates and saccharates may be employed instead of lime.

Another modification of the process above described consists in employing bicarbonate of magnesium, which, under the conditions hereinafter described, produces a soluble form of magnesium carbonate. By means of bicarbonate of magnesium an excellent separation may be effected, not only in the case of sacchariferous solutions, but also in vegetable juices, and an equally efficient clarifying of solutions from other organic substances, especially impure glycerine and such like liquids. For this purpose, instead of placing all or part of the magnesium carbonate into the sacchariferous or other solutions which are to be treated in the manner previously described, the soluble form of magnesium carbonate will itself be formed and immediately employed in the solution.

The following may serve as an example, for which as liquid to be treated a sugar solution has been chosen, to illustrate the practical application of this modification of the process. Magnesia in solid form (magnesium monoxide or magnesium carbonate) is treated with carbonic acid (of commerce) in a warm solution of sugar, about as obtained from saturated beet-root sirup, until it has dissolved, which will easily take place in a sugar solution, even if warm, without pressure and without producing incrystallizable sugar. The soluble magnesium carbonate thus formed produces in beet-root sirup or other raw sacchariferous sirups an excellent separation as soon as the equivalent amount of quicklime, either in the form of lime milk or powder, has been added, since the magnesium monoxide and carbonate of lime in forming and precipitating take the non-sacchariferous substances with them. About 0.1 per cent. magnesium monoxide as bicarbonate of magnesium and about 0.5 per cent. of lime are necessary to effect the clarification under normal conditions. This modification of the process, as in the method at first described, takes place in exactly the same manner if baryta or strontium be substituted for the lime-milk.

What I claim is—

The process of clarifying a liquid, which consists in precipitating the organic impurities of the liquid by the addition thereto of carbonate of magnesia, adding lime or its chemical equivalents to precipitate the magnesia, and adding a chemical—such as carbonic acid—to precipitate the excess of the said precipitant remaining in solution, substantially as set forth.

In testimony whereof I affix my signature in presence of two witnesses.

PAUL DEGENER.

Witnesses:
LYMAN A. SPALDING,
C. A. STARBUCK.